United States Patent
Li (10) Patent No.: US 12,152,887 B2
(45) Date of Patent: Nov. 26, 2024

(54) METHODS FOR PROCESSING MAP, AND VEHICLE

(71) Applicant: XIAOMI EV TECHNOLOGY CO., LTD., Beijing (CN)

(72) Inventor: Zhiwei Li, Beijing (CN)

(73) Assignee: XIAOMI EV TECHNOLOGY CO., LTD., Beijing (CN)

( * ) Notice: Subject to any disclaimer, the term of this patent is extended or adjusted under 35 U.S.C. 154(b) by 223 days.

(21) Appl. No.: 17/871,631

(22) Filed: Jul. 22, 2022

(65) Prior Publication Data

US 2023/0280165 A1 Sep. 7, 2023

(30) Foreign Application Priority Data

Mar. 1, 2022 (CN) .......................... 202210194607.2

(51) Int. Cl.
G01C 21/32 (2006.01)
G01C 21/00 (2006.01)

(52) U.S. Cl.
CPC ......... *G01C 21/32* (2013.01); *G01C 21/3848* (2020.08); *G01C 21/387* (2020.08); *G01C 21/3885* (2020.08)

(58) Field of Classification Search
None
See application file for complete search history.

(56) References Cited

U.S. PATENT DOCUMENTS

| | | | | |
|---|---|---|---|---|
| 2017/0039436 A1* | 2/2017 | Chen | .................. | G06V 10/454 |
| 2018/0188060 A1* | 7/2018 | Wheeler | ............... | B60W 40/04 |
| 2019/0056501 A1* | 2/2019 | Yu | ........................... | G01S 17/89 |
| 2019/0355173 A1 | 11/2019 | Gao | | |
| 2020/0143563 A1* | 5/2020 | Liu | ........................ | G06V 20/56 |
| 2021/0063200 A1* | 3/2021 | Kroepfl | ............... | C03C 17/3644 |
| 2022/0214186 A1* | 7/2022 | Bagheri | ............... | G06F 18/253 |
| 2022/0282993 A1* | 9/2022 | Peng | .................... | G01C 21/387 |
| 2022/0314979 A1* | 10/2022 | Oh | .................... | B60W 30/0956 |

FOREIGN PATENT DOCUMENTS

| | | |
|---|---|---|
| CN | 112380317 A | 2/2021 |
| CN | 112581612 A | 3/2021 |
| CN | 114034295 A | 2/2022 |

OTHER PUBLICATIONS

European Patent Application No. 22186625.4, extended Search and Opinion dated Jun. 1, 2023, 12 pages.
Saeedi, S. et al.; Multiple-Robot Simultaneous Localization and Mapping: A Review; Journal of Field Robotics 33(1), (2016), pp. 3-46.
Chinese Patent Application No. 2022101946072, Office Action dated Aug. 30, 2024, 9 pages.
Chinese Patent Application No. 2022101946072, English translation of Office Action dated Aug. 30, 2024, 14 pages.

* cited by examiner

*Primary Examiner* — Daniel L Greene
(74) *Attorney, Agent, or Firm* — Cozen O'Connor (57) ABSTRACT

A method for processing a map includes: obtaining a plurality of reference maps from vehicle-mounted devices; determining map elements included in the plurality of reference maps and a first element position where each map element is located; and obtaining a target map by fusing the map elements in the plurality of reference maps based on the first element position where each map element is located.

9 Claims, 4 Drawing Sheets

METHODS FOR PROCESSING MAP, AND VEHICLE

CROSS REFERENCE TO RELATED APPLICATIONS

This application claims priority to Chinese Patent Application No. 202210194607.2, filed on Mar. 1, 2022, the entire content of which is incorporated herein by reference.

TECHNICAL FIELD

The disclosure relates to the field of automatic driving technology, and more particularly to the field of high-precision maps, in particular to a method and an apparatus for processing a map, an electronic device, a medium and a vehicle.

BACKGROUND

A high precision map is an electronic map with high precision, high freshness and high richness whose absolute accuracy and relative accuracy are both within 1 meter, which is irreplaceable in the autonomous driving field. Compared with conventional navigation maps, the high-precision map needs to provide road information such as road type, curvature, position of a lane line, environmental object information such as roadside infrastructure, obstacles, traffic signs, as well as real-time dynamic information such as traffic flow and status of the traffic light.

SUMMARY

According to a first aspect of the disclosure, a method for processing a map is provided. The method includes: obtaining a plurality of reference maps from vehicle-mounted devices; determining map elements included in the plurality of reference maps and a first element position where each map element is located; and obtaining a target map by fusing the map elements in the plurality of reference maps based on the first element position where each map element is located.

According to a second aspect of the disclosure, another method for processing a map is provided. The method includes: collecting positioning data and a visual detection map; determining map elements included in the visual detection map by performing object recognition on the visual detection map; generating a reference map based on the positioning data and image positions of the map elements in the visual detection map; and sending the reference map to a server, so that the server obtains a target map by fusing the map elements in a plurality of reference maps based on a first element position of each map element in the reference map.

According to a third aspect of the disclosure, a vehicle is provided, including a vehicle body, a sensor device and a processor. The sensor device may be configured to collect positioning data and a visual detection map when the vehicle is being driven. The processor may be configured to determine map elements included in the visual detection map by performing object recognition on the visual detection map, generate a reference map based on the positioning data and image positions of the map elements in the visual detection map, and send the reference map to a server, so that the server obtains a target map by fusing the map elements in a plurality of reference maps based on a first element position of each map element in the reference map.

Additional aspects and advantages of the disclosure will be given in part in the following description, and some will become apparent from the following description, or learned through the practice of the disclosure.

BRIEF DESCRIPTION OF THE DRAWINGS

The above and/or additional aspects and advantages of the disclosure will become apparent and easy to understand from the following description of the embodiments in combination with the accompanying drawings.

DETAILED DESCRIPTION

Embodiments of the disclosure will be described in detail herein, examples of which are illustrated in the accompanying drawings, throughout which the same or similar reference numbers represent the same or similar elements or elements with the same or similar functions. The embodiments described below with reference to the accompanying drawings are exemplary and aims at explaining the disclosure, which may not be understood as limitations to the disclosure.

It should be noted that, in the embodiments of the disclosure, acquisition, storage and application of the data involved comply with the provisions of relevant laws and regulations, and do not violate public order and good customs.

The method and apparatus for processing a map, an electronic device, a non-transitory computer readable storage medium and a computer program product according to the embodiments of the disclosure are described below with reference to the accompanying drawings.

Figure 1:
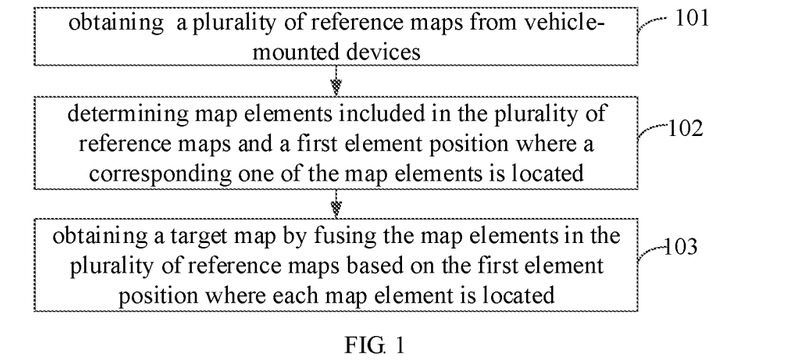
FIG. 1 is a flow diagram of a method for processing a map according to an embodiment of the disclosure.

FIG. 1 is a flow diagram of a method for processing a map according to an embodiment of the disclosure.

In the related art, data collection at designated roads is mostly performed by high-precision collection vehicles, which are equipped with expensive measurement devices, such as, a high-precision inertial navigation device, a scanning laser radar, etc., map production is completed by manual data editing and processing. The cost of data collection and map production is high and the efficiency is low. Therefore, how to effectively reduce the cost of data collection and map production while ensuring the accurate map, and improve the efficiency of map making has become an urgent problem to be solved.

In view of the above problem, the embodiments of the disclosure provide a method for processing a map, which achieves fusion of map elements in a plurality of reference maps based on a first element position of each map element, improves the position accuracy of map elements, reduces the cost of data collection and production and improves the efficiency of map production and update frequency by processing the reference maps obtained from a plurality of vehicle-mounted devices. As shown in FIG. 1, the method for processing a map includes the following steps at 101-103.

At 101, a plurality of reference maps from vehicle-mounted devices are obtained.

In the embodiment of the disclosure, the vehicle-mounted device may be a sensor device and a computing unit which meets the needs of the embodiment. The sensor device is configured to collect sensor data, and the computing unit is configured for automatic mapping. The sensor data includes image data, point cloud data of a laser radar, an inertial measurement unit (IU) data, a global navigation satellite system (GNSS) data, etc., which are not limited in this embodiment.

In this embodiment, a server obtains the plurality of reference maps from vehicle-mounted devices and performs subsequent processing steps. In a possible implementation, the reference map of the vehicle-mounted device may be established by the vehicle-mounted device based on the collected sensor data and sent to the server, so that the server may obtain the reference maps established by a plurality of vehicle-mounted devices. The reference map established by the plurality of vehicle-mounted devices may be sent to the server via network transmission or transmitted to the server via a physical copy, which is not limited in this embodiment. It should be noted that, the computing unit of the vehicle-mounted device may automatically complete production of the reference maps through an automatic recognition and reconstruction algorithm based on the received sensor data when the vehicle-mounted device establishes the reference maps.

In another possible implementation, the reference map of the vehicle-mounted device may be established by the server based on the sensor data sent by at least one vehicle-mounted device, so that the server may obtain the plurality of reference maps from vehicle-mounted devices, which is not limited in this embodiment.

Taking as an example that the reference maps are established by vehicle-mounted devices, when a plurality of vehicles with automatic driving function are being driven on a known road, sensor data is collected by using the sensor devices, an automatic mapping algorithm is running in the computing unit at a vehicle end to obtain the plurality of reference maps from vehicle-mounted devices, which are transmitted to the server through network transmission or a physical copy, so that the server may obtain the reference maps established by the plurality of vehicle-mounted devices.

Since the vehicle equipped with a sensor device and a computing unit that meet the needs of this embodiment may be reused, such as a vehicle with automatic driving function, a vehicle with an automobile data recorder, etc., the sensor device may be used to collect sensor data during vehicle driving, and automatic map making may be completed by running the automatic mapping algorithm via the computing unit at the vehicle end, the cost of data collection and map production may be effectively reduced, the efficiency of map production and update frequency may be improved, and the timeliness of the map may be enhanced.

At 102, it is determined map elements included in the plurality of reference maps and a first element position where a corresponding one of the map elements is located.

The map elements may be roads, lanes, lane lines, and road auxiliary elements, such as speed limit signs, traffic lights, etc., which are not limited in this embodiment.

In this embodiment, after the server obtains the plurality of reference maps from vehicle-mounted devices, the server may determine the map elements included in the plurality of reference maps and where the corresponding one of the map elements is located. The first element position is a position relationship of the map element in the reference map relative to the vehicle. It should be noted that, since the reference map is established based on the data collected by the vehicle-mounted device, the reference map may take the vehicle as a coordinate origin for establishing a coordinate system, so as to obtain the position relationship between the map element included in the reference map and the vehicle.

It may be understood that, the plurality of reference maps should be a result of map establishing on the same road for a plurality of times, so that the same map elements in the plurality of reference maps may be managed by determining the map elements included in the plurality of reference maps and the first element positions corresponding to the map elements, so as to improve the position accuracy of the map elements.

Since the server obtains the plurality of reference maps from vehicle-mounted devices, a first element position where the same map element is located in different reference maps may be different. At the same time, due to the existence of obstructions, the number of map elements included in different reference maps may also be different. Therefore, in order to ensure the position accuracy of map elements, the first element positions where the map elements included in the plurality of reference maps are located needs to be fused.

At 103, a target map is obtained by fusing the map elements in the plurality of reference maps based on the first element position where each map element is located.

In this embodiment, the map elements in the plurality of reference maps may be fused and reconstructed based on the first element position of each map element in the plurality of reference maps, so as to obtain the target map. In a possible implementation, the same map element in the plurality of reference maps is matched, position fusion is performed on the matched same map element in the plurality of reference maps based on the first element position where the same map element is located in each reference map, to obtain the target map.

In another possible implementation, since the number of map elements included in different reference maps may be different, an identical/same map element with lower occurrence times may be filtered out by counting the occurrence times of the same map element in the plurality of reference maps, and fusion reconstruction may be carried out based on the first element positions where the remaining same map elements in each reference map are located, so as to obtain the target map, which is not limited in this embodiment.

It should be noted that, in the method for processing a map according to this embodiment, the map elements included in the plurality of reference maps and the first element positions of the corresponding map elements are directly determined based on the reference maps obtained from the plurality of vehicle-mounted devices, and the map elements in the plurality of reference maps are fused based on the first element positions of the corresponding map elements to obtain the target map. Thus, positions of the map elements included in the target map may be consistent with their physical positions in the real world, which improves the position accuracy of the map elements and ensures the consistency between the target map and the real world.

In this embodiment, the plurality of reference maps from vehicle-mounted devices are obtained, it is determined that the map elements included in the plurality of reference maps and the first element positions where the corresponding map elements are located, and the target map is obtained by fusing the map elements in the plurality of reference maps based on the first element position of each map element. Since the map elements in the plurality of reference maps may be fused based on the first element position of each map element, the target map may be obtained, which improves the position accuracy of the map elements and ensures the consistency between the target map and the real world. At the same time, since the plurality of reference maps from vehicle-mounted devices may be obtained for corresponding processing, costs of data collection and production are reduced, and the efficiency of processing a map may be effectively improved.

Figure 2:
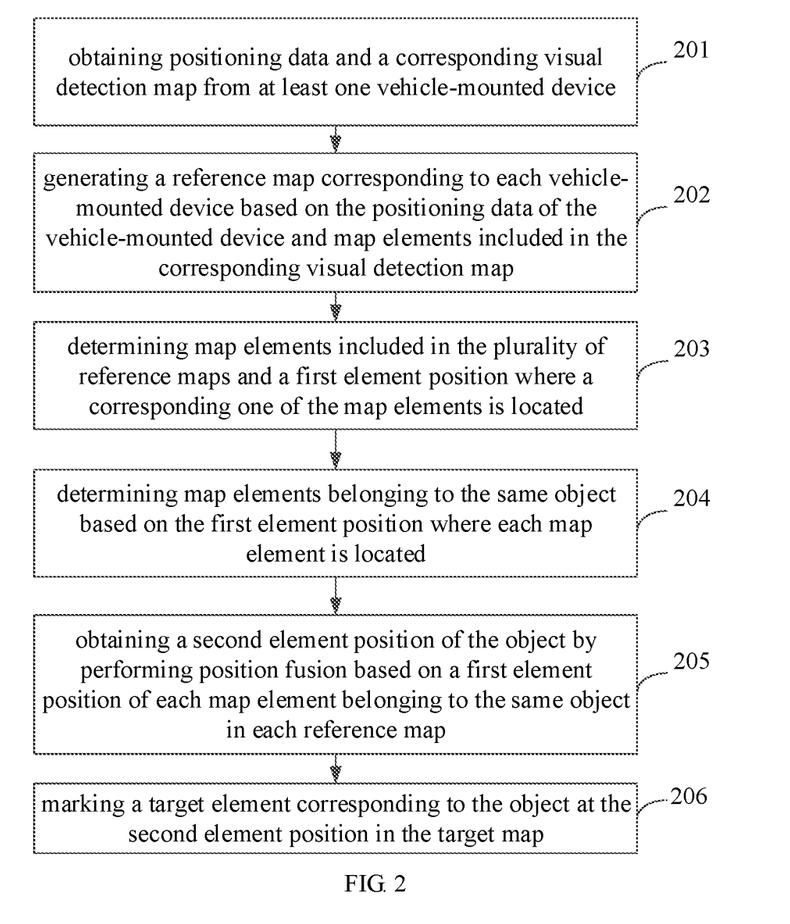
FIG. 2 is a schematic diagram of another method of processing a map according to an embodiment of the disclosure.

In order to clearly illustrate the previous embodiment, this embodiment provides another method for processing a map, and FIG. 2 is a schematic flowchart of another method for processing a map according to the embodiment of the disclosure.

As shown in FIG. 2, the method for processing a map may include the following steps at 201-206.

At 201, positioning data and a corresponding visual detection map are obtained from at least one vehicle-mounted device.

In this embodiment, the vehicle-mounted device may be a sensor device and a computing unit that meet the needs of this embodiment. The sensor device is configured to collect sensor data, and the computing unit is configured for automatic mapping. The sensor data includes, but is not limited to, the positioning data and corresponding visual detection maps.

It may be understood that during the movement of a vehicle equipped with the sensor device and the computing unit that meet the needs of this embodiment, sensor data may be continuously collected by the mounted sensors. In other words, the positioning data and the corresponding visual detection map may be continuously collected. The vehicle-mounted device may send the collected positioning data and the corresponding visual detection map to a server. It should be noted that, the positioning data and the corresponding visual detection map collected by the vehicle-mounted device may be sent to the server through network transmission or through a physical copy, which is not limited in this embodiment.

In this embodiment, the server may obtain the positioning data and the corresponding visual detection map from at least one vehicle-mounted device. It should be noted that, the positioning data and the corresponding visual detection map should be sensor data collected by different vehicles on the same road, which are equipped with the sensor device and computing unit that meet the needs of this embodiment, so as to ensure that the plurality of reference maps from vehicle-mounted devices that are established by the server based on the positioning data and the corresponding visual inspection detection map are a result of establishing a map on the same road for a plurality of times.

At 202, a reference map corresponding to each vehicle-mounted device is generated based on the positioning data of the vehicle-mounted device and map elements included in the corresponding visual detection map.

The map elements may be roads, lanes, lane lines, and road auxiliary elements, such as speed limit signs, traffic lights, etc., which are not limited in this embodiment.

In this embodiment, the server may generate the reference map corresponding to each vehicle-mounted device based on the positioning data of the vehicle-mounted device and the map elements included in the corresponding visual detection map. As a possible implementation, the positioning data is used to locate position coordinates of the vehicle in the real world, and the map elements included in the corresponding visual detection map are all vector elements, which may describe a shape and relative position of each map element. Thus, the server may establish an image coordinate system by taking the vehicle as a coordinate origin, and a reference map corresponding to each vehicle-mounted device may be generated based on the map elements included in the corresponding visual detection map.

At 203, the map elements included in the plurality of reference maps and the first element positions where the corresponding map elements are located are determined.

It should be noted that, for the execution process at 203, reference may be made to the execution process at 102 in the previous embodiment, and the principle is the same, which may not be repeated here.

At 204, map elements belonging to the same object are determined based on the first element positions where each map element is located.

In this embodiment, the server may determine the map elements belonging to the same object based on the first element positions where the map elements included in the plurality of reference maps are located. As a possible implementation, the reference map may be represented in a form of the image coordinate system, so that each map element in the same coordinate area may be determined as one belonging to the same object based on the first element position of each map element. The range of the coordinate area may be manually set according to the actual situations.

It may be understood that, since the plurality of reference maps should be a result of establishing a map on the same road for a plurality of times, the reference map is represented in a form of the image coordinate system, and the first element position where the same map element is located should be in the same coordinate area. In other words, the map elements belonging to the same object should be the same map element, so as to ensure that the map elements belonging to the same object are the same map element, the range of the manually set coordinate area should not be too large.

At 205, a second element position of the object is obtained by performing position fusion based on a first element position of each map element belonging to the same object in each reference map.

In this embodiment, the server may perform position fusion based on the first element positions of map elements belonging to the same object in each reference map with a re-projection error optimization algorithm, thus obtaining the second element position of the same object. The second element position of the object is a position coordinate of the object in the real world, which may be represented by latitude and longitude. Since the server may obtain the positioning data (that is, the position coordinate of the vehicle in the real world), and may obtain the first element positions of the map elements belonging to the same object in each reference map (that is, the position relationships of the map elements belonging to the same object in each reference map relative to the vehicle). Thus, the vehicle may be served as an intermediary to perform coordinate transformation and obtain the second element position of the object (that is, the position coordinate of the object in the real world).

Bundle Adjustment (BA) refers to extracting the optimal 3D (three-dimensional) model and camera parameters from visual reconstruction. The camera parameters include internal parameters and external parameters. Specifically, the BA refers to a process that after optimal adjustment for a camera pose and a position of the feature point are performed, bundles of light rays reflected from each feature point are finally converged to the light center. The re-projection error optimization algorithm is built using these light beams.

When the camera takes a picture, 3D space points are projected onto an image, which is the first projection, so that these images may be used to triangulate feature points, and geometric information may be used to construct triangles to determine positions of the 3D space points. The calculated coordinates of the 3D points and the camera pose are used to perform a second projection, which is a re-projection. It should be noted that, the calculated coordinates of the 3D point and the camera pose are not real.

Since there are differences between the projection and re-projection of the real 3D space points on the image plane, these differences are re-projection errors and the re-projection error optimization algorithm needs to optimize the re-projection errors and obtain an optimal camera pose parameter and coordinates of the 3D space points. The projection of the real 3D space points on the image plane are pixel points on the image, and the re-projection of the real 3D space point on the image plane are the virtual pixel points calculated.

At 206, a target element corresponding to the object is marked at the second element position in the target map.

In this embodiment, after obtaining the second element position of the object, the server may generate a target map, and mark the target element corresponding to the object at the second element position in the target map, thus ensuring the consistency between the target map and the real world.

It may be understood that since the plurality of reference maps should be a result of establishing a map on the same road for a plurality of times, the target map obtained is a map on a certain road. In order to obtain a complete map of a city, it needs to combine a plurality of target maps for joint optimization. Since different target maps may contain the same map elements, the target element corresponding to the object is marked at the second element position in the target map, which is beneficial to joint optimization of the target maps, which and may ensure the consistency between the jointly obtained map and the real world.

In this embodiment, the plurality of reference maps from vehicle-mounted devices are obtained, the map elements included in the plurality of reference maps and the first element positions where the corresponding map elements are located are determined, and the target map is obtained by fusing the map elements in the plurality of reference maps based on the first element positions of each map element. Since the map elements in the plurality of reference maps may be fused based on the first element position of each map element, the target map may be obtained, which improves the position accuracy of the map elements and ensures the consistency between the target map and the real world. At the same time, since the plurality of reference maps from vehicle-mounted devices may be obtained for corresponding processing, the cost of data collection and production is reduced, and the efficiency of processing a map may be effectively improved.

Figure 3:
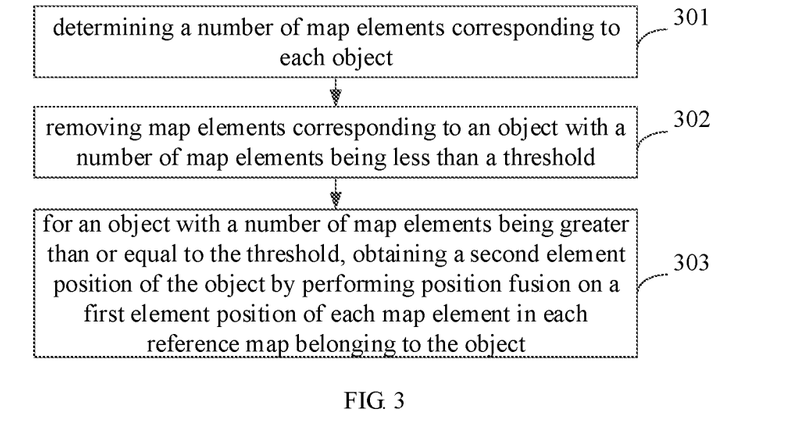
FIG. 3 is a flow diagram of obtaining a second element position of an object in a scenario.

In order to clearly illustrate the step at 205 in the embodiment shown in FIG. 2, this embodiment provides a schematic flowchart of obtaining a second element position of an object in a scenario shown in FIG. 3. As shown in FIG. 3, obtaining a second element position of the object by performing position fusion based on a first element position of each map element belonging to the same object in each reference map may include the following steps 301-303.

At 301, a number of map elements corresponding to each object determined.

Here, the server may count data of the map elements belonging to the same object, so as to determine the number of map elements corresponding to each object.

At 302, map elements corresponding to an object with the number of map elements smaller than a threshold are removed.

The threshold may be a value manually set according to the actual situations. It should be noted that, the threshold should be smaller than the number of map elements in the reference map on the same road. As a possible implementation, the threshold may be set as a half of the number of map elements in the reference map on the same road.

Here, the server removes the map elements corresponding to an object whose map element number is smaller than the threshold, and remains the map elements corresponding to an object whose map element number is greater than or equal to the threshold.

At 303, for an object with the number of map elements greater than or equal to the threshold, a second element position of the object is obtained by performing position fusion on a first element position of each map element in each reference map belonging to the object.

Here, for the object whose map element number is greater than or equal to the threshold, the server may obtain the second element position of the object by performing position fusion based on the first element position of each map element in each reference map belonging to the object with a re-projection error optimization algorithm. The second element position of the object is a position coordinate of the object in the real world, which may be represented by latitude and longitude.

To sum up, the number of map elements corresponding to each object is determined the map elements corresponding to the object with the number of map elements smaller than the threshold are removed, and for an object with the number of map elements greater than or equal to the threshold, position fusion is performed on a first element position of each map element in each reference map belonging to the object to obtain the second element position of the object, which effectively improves the efficiency of position fusion by the server based on the first element position in each reference map of map elements belonging to the same object.

Figure 4:
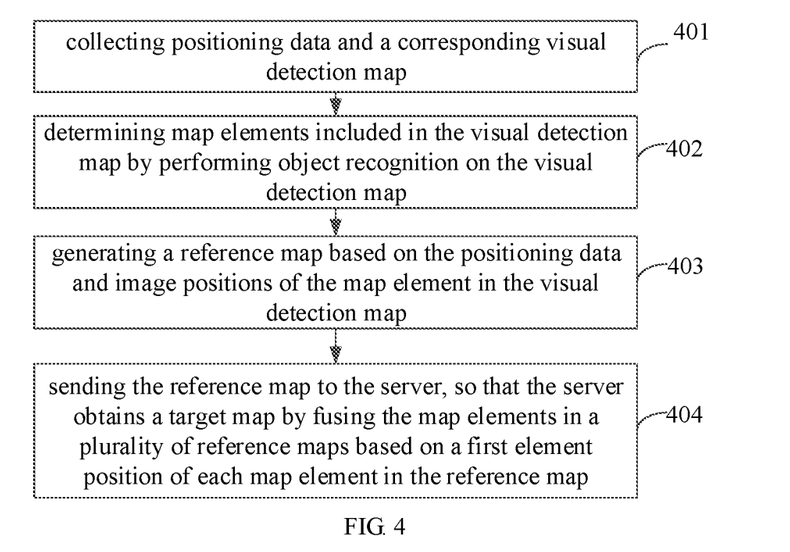
FIG. 4 is a flow diagram of yet another method for processing a map according to an embodiment of the disclosure.

It should be noted that the above embodiment is described from the perspective of the server. In order to explain the map processing process more clearly, the embodiment of the disclosure provides a possible implementation of the method for processing a map described from the perspective of a vehicle-mounted device. FIG. 4 is a flow diagram of yet another method for processing a map according to an embodiment of the disclosure. In this embodiment, the vehicle-mounted device may be a sensor device and a computing unit that meet the needs of this embodiment. The sensor device is configured to collect sensor data, and the computing unit is configured for automatic mapping.

As shown in FIG. 4, the method for processing a map may include the following steps at 401-404.

At 401, positioning data and a corresponding visual detection map are collected.

In this embodiment, the sensor device for collecting sensor data may continuously collect sensor data during the movement of a vehicle equipped with the sensor device and the computing unit that meet the needs of this embodiment, where the sensor data includes but is not limited to the positioning data and the corresponding visual detection map. Then, the sensor device may send the collected positioning data and corresponding visual detection map to the computing unit used for automatic mapping, and the computing unit may perform automatic mapping based on the received positioning data and corresponding visual detection map.

At 402, object recognition is performed on the visual detection map to determine map elements included in the visual detection map.

In this embodiment, after the positioning data and the corresponding visual detection map are received, the computing unit deployed at the vehicle end may perform object recognition on the visual detection map to determine the map elements included in the visual detection map, so that image positions of the map elements in the visual detection map may be obtained.

At 403, a reference map is generated based on the positioning data and image positions of the map elements in the visual detection map.

In this embodiment, the computing unit may generate the reference map by running an automatic mapping algorithm to automatically complete map making based on the received positioning data and the image positions of the map elements in the visual detection map obtained at 402.

At 404, the reference map is sent to the server, so that the server obtains a target map by fusing the map elements in a plurality of reference maps based on a first element position of each map element in the reference map.

In this embodiment, the computing unit may send the generated reference map to the server, so that the server obtains the target map by fusing the map elements in the plurality of reference maps based on the first element position of each map element in the reference map. It should be noted that, the computing unit may send the reference map to a server through network transmission, or may transmit the reference map to the server through a physical copy, which is not limited in this embodiment.

In this embodiment, the positioning data and corresponding visual detection map are collected; object recognition is performed on the visual detection map to determine the map elements included in the visual detection map; the reference map is generated based on the positioning data and image positions of the map elements in the visual detection map; the reference map is sent to the server, so that the server obtains the target map by fusing the map elements in the plurality of reference maps based on the first element position of each map element in the reference map. As a result, map data collection may be achieved with low cost, single-vehicle collection and crowdsourcing collection may be supported, which may effectively increase the map update frequency and enhance the timeliness of the map.

Figure 5:
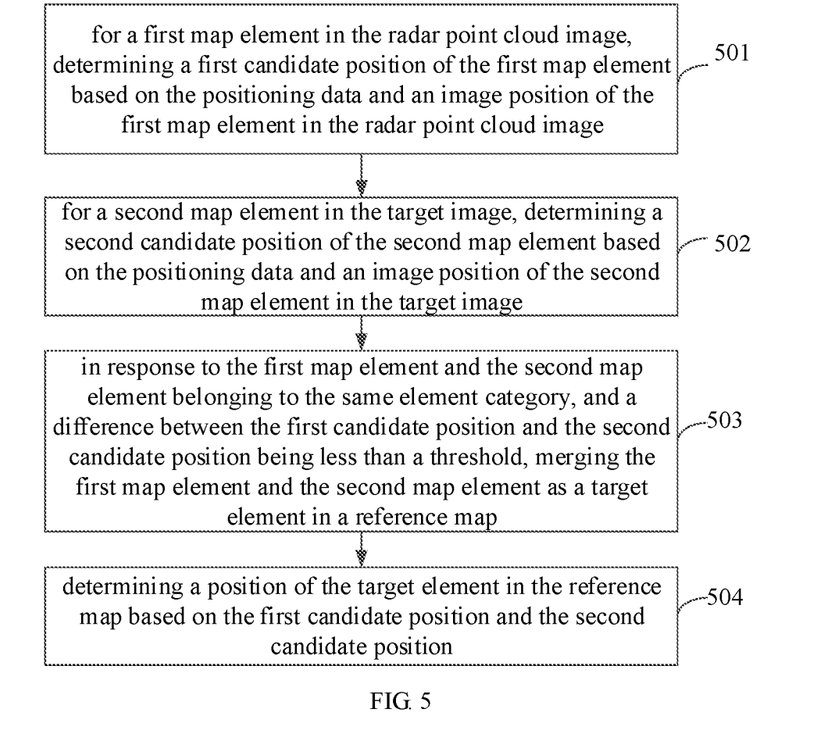
FIG. 5 is a flow diagram of generating a reference map in a scenario.

In order to clearly illustrate the process at 403 in the embodiment shown in FIG. 4, this embodiment provides a flow diagram of generating a reference map in a scenario. As shown in FIG. 5, generating the reference map based on the positioning data and image positions of the map elements in the visual detection map may include the following steps at 501-504.

It should be noted that the sensor device may include an image sensor and/or a laser radar sensor, and the visual detection map includes a radar point cloud image and a target image collected by the image sensor, where the radar point cloud image is collected by the laser radar sensor.

At 501, for a first map element in the radar point cloud image, a first candidate position of the first map element is determined based on the positioning data and an image position of the first map element in the radar point cloud image.

Here, for the first map element in the radar point cloud image collected by the laser radar sensor, the computing unit may determine the first candidate position of the first map element based on the positioning data and the image position of the first map element in the radar point cloud image.

At 502, for a second map element in the target image, a second candidate position of the second map element is determined based on the positioning data and an image position of the second map element in the target image.

Here, for the second map element in the target image collected by the image sensor, the computing unit may determine the second candidate position of the second map element based on the positioning data and the image position of the second map element in the target image.

At 503, in response to the first map element and the second map element belonging to the same element category, and a difference between the first candidate position and the second candidate position being less than a threshold, the first map element and the second map element are merged as a target element in a reference map.

Here, in the case that the first map element and the second map element belong to the same element category, and the difference between the first candidate position and the second candidate position is less than the threshold, the computing unit may merge the first map element and the second map element as the target element in the reference map. The threshold may be a value manually set according to the actual situations.

At 504, a position of the target element in the reference map is determined based on the first candidate position and the second candidate position.

Here, the computing unit may determine the position of the target element in the reference map based on the first candidate position of the first map element and the second candidate position of the second map element. As a possible implementation, a weighted average of the first candidate position of the first map element and the second candidate position of the second map element may be performed to obtain the position of the target element in the reference map.

To sum up, for a first map element in the radar point cloud image, the first candidate position of the first map element is determined based on the positioning data and the image position of the first map element in the radar point cloud image; for a second map element in the target image, the second candidate position of the second map element is determined based on the positioning data and the image position of the second map element in the target image; in response to the first map element and the second map element belonging to the same element category, and the difference between the first candidate position and the second candidate position being less than the threshold, the first map element and the second map element are merged as the target element in the reference map; and a position of the target element in the reference map is determined based on the first candidate position and the second candidate position. As a result, the target map may be automatically identified and reconstructed, and the map production may be completed automatically without labor cost, thus effectively improving the map production efficiency.

In order to clearly illustrate the above embodiments, examples are now described.

Figure 6:
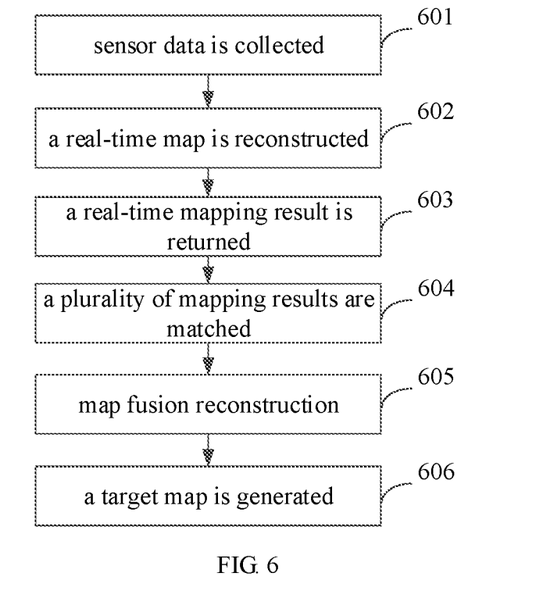
FIG. 6 is a flow diagram of generating a target map in a scenario.

For example, FIG. 6 is a flow diagram of generating a target map in a scenario. As shown in FIG. 6, the method for processing a map may include the following steps at 601-606.

At 601, sensor data is collected.

Here, a sensor device and a computing unit for mapping are deployed at the vehicle end, the sensor device continuously collects sensor data during the operation of the vehicle. The sensor data may include image data, laser radar point cloud data, IU data, GNSS data, and the like. It should be noted that the sensor device may send the collected sensor data to the computing unit for automatic mapping, so that the computing unit may perform automatic mapping based on the received sensor data.

At 602, a real-time map is reconstructed.

Here, after the computing unit at the vehicle end receives the sensor data, when the sensor data includes image data collected by the image sensor, an image is recognized and map elements such as lane lines, speed limit signs, traffic lights, etc. are identified. 3D reconstruction of the map elements is performed by using multiple view geometry constrains. When the sensor data includes the radar point cloud image data collected by the laser radar sensor, map elements are also identified and reconstructed for the radar point cloud image. When the sensor data includes both the image data collected by the image sensor and the radar point cloud image data collected by the laser radar sensor, the two types of reconstruction results are fused.

At the same time, the computing may also calculate a motion trajectory of the vehicle by using the GNSS data and IMU the data, as well as the image data and the laser radar data, and multi-frame fusion is performed on the previous reconstruction results by using the motion trajectory to obtain a mapping result for the driving route of the vehicle at this time.

At 603, a real-time mapping result is returned.

Here, for a vehicle equipped with a network transmission device, the mapping result may be sent back to a mapping server in real time through the network, while for a vehicle without the network transmission device, the mapping result needs to be copied to the server by a physical copy.

At 604, a plurality of mapping results are matched.

It should be noted that, the accuracy of the mapping results obtained by the vehicle passing through the road for a time is not optimal. For example, when the lane is wide, the reconstruction accuracy of map elements farther from the vehicle is relatively low. Therefore, fusion of a plurality of mapping results needs to be performed at the server side. First, a single mapping result may be matched to a road based on a trajectory of the single mapping result and existing road network information of a navigation map. Then, all the plurality of mapping results are matched to the same road, and a plurality of mapping results on the same road are obtained, so as to manage the same elements in the plurality of reconstruction results.

At 605, map fusion reconstruction.

Here, after the mapping results and elements associated for a plurality of times are obtained, a Bundle Adjustment method may be used to jointly optimize the plurality of mapping results, so as to obtain a mapping result with high precision that meet the usage needs.

Step 606, a target map is generated.

Here, after the execution of step 605 is completed, the obtained mapping result is the final target map.

To sum up, the vehicle-mounted device realizes real-time map reconstruction through sensor data collection, so that the real-time mapping results are sent back to the server, and the server performs matching of a plurality of mapping results to achieve the map fusion reconstruction and generate a target map. As a result, costs of the data collection and map production are effectively reduced, map production efficiency and update frequency are improved, and the timeliness of the map is enhanced.

Corresponding to the methods for processing a map according to the above embodiments of FIGS. 1 to 3, the disclosure also provides an apparatus for processing a map. Since the apparatus for processing a map according to the embodiments of the disclosure correspond to the method for processing a map according to the above embodiments of FIGS. 1 to 3. The implementation of the method for processing a map is also applicable to the apparatus for processing a map according to the embodiment of the disclosure, which may not be described in detail in the embodiments of the disclosure.

Figure 7:
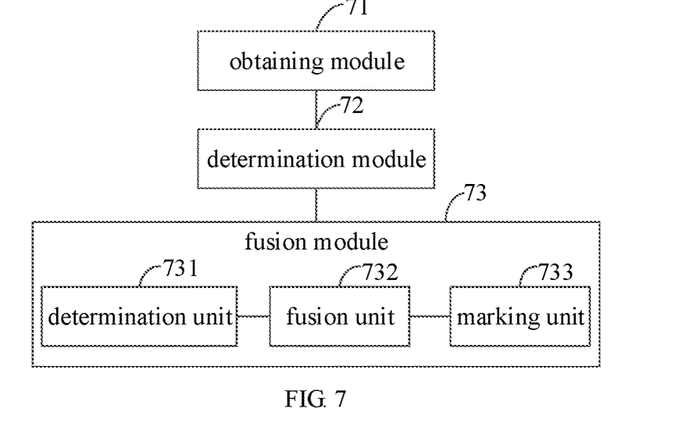
FIG. 7 is a structural diagram of an apparatus for processing a map according to an embodiment of the disclosure.

FIG. 7 is a structural diagram of an apparatus for processing a map according to an embodiment of the disclosure.

As shown in FIG. 7, the apparatus for processing a map includes an obtaining module 71, a determination module 72 and a fusion module 73.

The obtaining module 71 is configured to obtain a plurality of reference maps from vehicle-mounted devices.

The determination module 72 is configured to determine map elements included in the plurality of reference maps and a first element position where a corresponding one of the map elements is located.

The fusion module 73 is configured to obtain a target map by fusing the map elements in the plurality of reference maps based on the first element position where each map element is located.

Further, in a possible implementation of embodiments of the disclosure, the fusion module 73 includes a determination unit 731, a fusion unit 732 and a marking unit 733.

The determination unit 731 is configured to determine map elements belonging to the same object based on the first element position where each map element is located.

The fusion unit 732 is configured to obtain a second element position of the object by performing position fusion based on a first element position of each map element belonging to the same object in each reference map.

The marking unit 733 is configured to mark a target element corresponding to the object at the second element position in the target map.

Further, in a possible implementation of embodiments of the disclosure, the fusion unit 732 is configured to: determine a number of map elements corresponding to each object; remove map elements corresponding to an object with the number of map elements smaller than a threshold; and for an object with the number of map elements greater than or equal to the threshold, obtain a second element position of the object by performing position fusion on a first element position of each map element in each reference map belonging to the object.

Further, in a possible implementation of embodiments of the disclosure, the fusion unit 732 is configured to: obtain the second element position of the object by performing position fusion based on the first element position of each map element in each reference map belonging to the object with a re-projection error optimization algorithm.

Further, in a possible implementation of embodiments of the disclosure, the obtaining module 71 is configured to: obtain positioning data and a corresponding visual detection map from at least one vehicle-mounted device; and generate a reference map corresponding to each vehicle-mounted device based on the positioning data of the vehicle-mounted device and map elements included in the corresponding visual detection map.

Further, in a possible implementation of embodiments of the disclosure, the obtaining module 71 is configured to: obtain reference maps established by the plurality of vehicle-mounted devices.

In this embodiment of the disclosure, the plurality of reference maps from vehicle-mounted devices are obtained, it is determined that the map elements included in the plurality of reference maps and the first element positions where the corresponding map elements are located, and the target map is obtained by fusing the map elements in the plurality of reference maps based on the first element position of each map element. Since the map elements in the plurality of reference maps may be fused based on the first element position of each map element, the target map may be obtained, which improves the position accuracy of the map elements and ensures the consistency between the target map and the real world. At the same time, since the plurality of reference maps from vehicle-mounted devices may be obtained for corresponding processing, costs of data collection and production are reduced, and the efficiency of processing a map may be effectively improved.

Corresponding to the methods for processing a map according to the embodiments shown in FIGS. 4 to 5, the embodiments of the disclosure also provide another apparatus for processing a map. Since the apparatus for processing a map according to embodiments of the disclosure corresponds to the method for processing a map according to the embodiments shown in FIGS. 4 to 5, the implementation of the method for processing a map is also suitable for the apparatus for processing a map according to embodiments of the disclosure, which may not be described in detail here.

Figure 8:
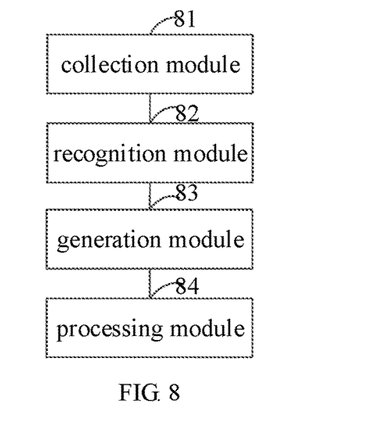
FIG. 8 is a structural diagram of another apparatus for processing a map according to an embodiment of the disclosure.

FIG. 8 is a structural diagram of another apparatus for processing a map according to an embodiment of the disclosure.

As shown in FIG. 8, the apparatus for processing a map includes: a collection module 81, a recognition module 82, a generation module 83 and a processing module 84.

The collection module 81 is configured to collect positioning data and a corresponding visual detection map.

The recognition module 82 is configured to determine map elements included in the visual detection map by performing object recognition on the visual detection map.

The generation module 83 is configured to generate a reference map based on the positioning data and image positions of the map elements in the visual detection map.

The processing module 84 is configured to send the reference map to a server, so that the server obtains a target map by fusing the map elements in a plurality of reference maps based on a first element position of each map element in the reference map.

Further, in a possible implementation of embodiments of the disclosure, the visual detection map comprises: a radar point cloud map and a target image collected by an image sensor. The generation module 83 includes: a first determination unit 831, a second determination unit 832, a merging unit 833 and a third determination unit 834.

The first determination unit 831 is configured to, for a first map element in the radar point cloud image, determine a first candidate position of the first map element based on the positioning data and an image position of the first map element in the radar point cloud image.

The second determination unit 832 is configured to, for a second map element in the target image, determine a second candidate position of the second map element based on the positioning data and an image position of the second map element in the target image.

The merging unit 833 is configured to, in response to the first map element and the second map element belonging to the same element category, and a difference between the first candidate position and the second candidate position being less than a threshold, merge the first map element and the second map element as a target element in a reference map.

The third determination unit 834 is configured to determine a position of the target element in the reference map based on the first candidate position and the second candidate position.

In this embodiment of the disclosure, the positioning data and corresponding visual detection map are collected; object recognition is performed on the visual detection map to determine the map elements included in the visual detection map; the reference map is generated based on the positioning data and image positions of the map elements in the visual detection map; the reference map is sent to the server, so that the server obtains the target map by fusing the map elements in the plurality of reference maps based on the first element position of each map element in the reference map. As a result, map data collection may be achieved with low cost, single-vehicle collection and crowdsourcing collection may be supported, which may effectively increase the map update frequency and enhance the timeliness of the map.

The disclosure also provides an electronic device, which includes at least one processor, and a memory communicatively coupled with the at least one processor and stored with instructions executable by the at least one processor. When the instructions are executed by the at least one processor, the at least one processor is caused to execute the method for processing a map according to any one of the embodiments of the disclosure described above.

Figure 9:
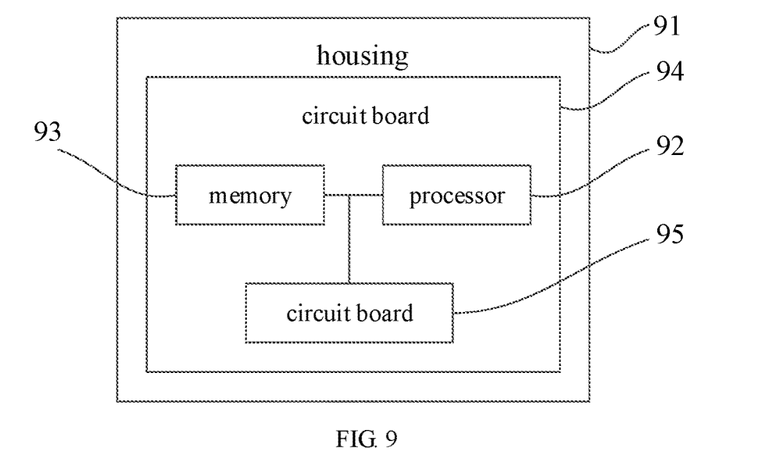
FIG. 9 is a structural diagram of an electronic device according to an embodiment of the disclosure.

FIG. 9 is a structural diagram of an electronic device according to an embodiment of the disclosure, which may implement the flowchart of the embodiments in FIGS. 1 to 8. As shown in FIG. 9, the electronic device may include a housing 91, a processor 92, a memory 93, a circuit board 94 and a power circuit 95. The circuit board 94 is arranged in a space surrounded by the housing 91, and the processor 92 and the memory 93 are arranged on the circuit board 94. The power circuit 95 is configured to supply power to each circuit or device in the electronic device. The memory 93 is configured to store executable program codes. The processor 92 runs a program corresponding to the executable program codes by reading the executable program codes stored in the memory 93, so as to execute the method for processing a map described in any of the above embodiments.

The specific execution process of the above steps by the processor 92 and the processor 92 running the executable program codes for further executing the steps may be described in the description of the embodiment shown in FIGS. 1 to 8 of the disclosure, which will not be repeated here.

In order to achieve the above embodiments, the disclosure also provides a non-transitory computer-readable storage medium having computer instructions stored thereon. The computer instructions are configured to cause a computer to execute the method for processing a map described in any of the above embodiments.

In order to achieve the above embodiments, the disclosure also provides a computer program product, which includes a computer program. When the computer program is executed by a processor, the method for processing a map described in any of the above embodiments is implemented.

In order to achieve the above embodiments, the disclosure also provides a vehicle, which includes a vehicle body and the electronic device according to the above embodiment of the disclosure.

In the description of the specification, the description referring to the terms "one embodiment", "some embodiments", "examples", "specific examples", or "some examples" means that the specific features, structures, materials, or features described in connection with the embodiments or examples are included in at least one embodiment or example of the disclosure. In this specification, the schematic expression of the above terms does not necessarily refer to the same embodiments or examples. Moreover, the specific features, structures, materials, or features described may be combined in a suitable manner in any one or more embodiments or examples. In addition, those skilled in the art may merge and combine the different embodiments or examples described in this specification and the features of different embodiments or examples, without conflicting to each other.

In addition, the terms "first" and "second" are used for descriptive purposes and may not be understood as indicating or implying relative importance or implicitly indicating the number of indicated technical features. Thus, the features defined with "first" and "second" may explicitly or implicitly include at least one of the features. In the description of the disclosure, "a plurality of" means at least two, such as two, three, etc., unless otherwise expressly and specifically defined.

Any process or method description in the flowchart or otherwise described herein may be understood as a module, a fragment or a part of code that represents executable instructions including one or more steps for implementing a particular logical function or process, and the scope of the preferred implementation of the disclosure includes additional implementations, which may not be in the order shown or discussed, which includes performing functions in a basically simultaneous manner or in a reverse order according to the involved functions, which should be understood by those skilled in the art to which the embodiments of the disclosure belong.

The logic and/or steps represented in the flowchart or otherwise described herein, for example, may be considered as a sequenced list of executable instructions for realizing logical functions, which may be specifically implemented in any computer-readable medium, for use of an instruction execution system/apparatus/device (such as a computer-based system, a system including a processor, or other system that may take instructions for execution from the instruction execution system/apparatus/device), or for use in combination with the instruction execution system/apparatus/device. For the purposes of this specification, "computer readable medium" may be any device that may contain, store, communicate, propagate or transmit programs for use by or in combination with the instruction execution system/apparatus/device. More specific examples (a non-exhaustive list) of computer-readable media include the following: an electrical connection unit (or an electronic device) with one or more wiring, a portable computer case (a magnetic device), a random access memory (RAM), a read-only memory (ROM), an erasable editable read-only memory (EPROM) or a flash memory, an optical fiber device, and a portable optical disk read-only memory (CDROM). In addition, the computer-readable medium may even be paper or other suitable medium on which the program may be printed, since the program may be obtained electronically, for example, by optical scanning of the paper or other medium, followed by editing, interpretation, or other suitable processing if necessary, and then stored in the computer memory.

It should be understood that, parts of the disclosure may be implemented in hardware, software, firmware, or a combination thereof. In the above described embodiments, a plurality of steps or methods may be implemented with software or firmware stored in a memory and executed by a suitable instruction execution system. For example, when it is implemented in hardware as in another embodiment, it may be implemented by any of the following technologies known in the art or their combination: discrete logic circuits with logic gate circuits for realizing logic function of data signal, application specific integrated circuits with appropriate combined logic gate circuits, programmable gate arrays (PGAs), field programmable gate arrays (FPGAs), etc.

Those skilled in the art may understand that all or part of the steps carried by the method of realizing the above embodiments may be completed by instructing the relevant hardware through a program, and the program may be stored in a computer-readable storage medium. When the program is executed, one or a combination of the steps of the method embodiments is implemented.

In addition, the functional units in various embodiments of the disclosure may be integrated in a processing module, or each unit may exist separately, or two or more units may be integrated in one module. The above integrated modules may be implemented in the form of hardware or software function modules. When the integrated module is realized in the form of software function module and sold or used as an independent product, it may also be stored in a computer-readable storage medium.

The storage medium mentioned above may be a read-only memory, a magnetic disk or an optical disk, etc. Although the embodiments of the disclosure have been shown and described above, it may be understood that the above embodiments are exemplary and may not be understood as limitations of the disclosure. Those skilled in the art may change, modify, replace and modify the above embodiments within the scope of the disclosure.

The invention claimed is:

1. A method for processing a map, performed by a server, the method comprising:
    obtaining a plurality of reference maps from vehicle-mounted devices;
    determining map elements included in the plurality of reference maps and a first element position where each map element is located;
    determining map elements belonging to each object based on the first element position where each map element is located;
    in response to determining that a number of map elements belonging to a first object is smaller than a threshold, removing the map elements belonging to the first object;
    in response to determining that a number of map elements belonging to a second object is greater than or equal to the threshold, obtaining a second element position of the second object by performing position fusion on the first element position of each map element in each reference map belonging to the second object; and marking a target element corresponding to the second object at the second element position in the target map.

2. The method of claim 1, wherein obtaining the second element position of the second object comprises:
obtaining the second element position of the second object by performing position fusion based on the first element position of each map element in each reference map belonging to the second object with a re-projection error optimization algorithm.

3. The method of claim 1, wherein obtaining the plurality of reference maps from vehicle-mounted devices comprises:
obtaining positioning data and a visual detection map from at least one vehicle-mounted device; and
generating a reference map corresponding to each vehicle-mounted device based on the positioning data of the vehicle-mounted device and map elements included in the visual detection map.

4. The method of claim 1, wherein obtaining the plurality of reference maps from vehicle-mounted devices comprises:
obtaining the reference maps established by a plurality of vehicle-mounted devices.

5. A method for processing a map, performed by a vehicle-mounted device, comprising:
collecting positioning data and a visual detection map;
determining map elements included in the visual detection map by performing object recognition on the visual detection map;
generating a reference map based on the positioning data and image positions of the map elements in the visual detection map; and
sending the reference map to a server, so that the server determines map elements included in a plurality of reference maps and a first element position where each map element is located, determines map elements belonging to each object based on the first element position where each map element is located, removes the map elements belonging to a first object in response to determining that a number of map elements belonging to the first object is smaller than a threshold, obtains a second element position of a second object by performing position fusion on the first element position of each map element in each reference map belonging to the second object in response to determining that a number of map elements belonging to a second object is greater than or equal to the threshold, and marks a target element corresponding to the second object at the second element position in a target map.

6. The method of claim 5, wherein the visual detection map comprises: a radar point cloud map and a target image collected by an image sensor;
generating the reference map comprises:
for a first map element in the radar point cloud image, determining a first candidate position of the first map element based on the positioning data and an image position of the first map element in the radar point cloud image;
for a second map element in the target image, determining a second candidate position of the second map element based on the positioning data and an image position of the second map element in the target image;
in response to the first map element and the second map element belonging to a same element category, and a difference between the first candidate position and the second candidate position being less than a threshold, merging the first map element and the second map element as a target element in a reference map; and
determining a position of the target element in the reference map based on the first candidate position and the second candidate position.

7. A vehicle, comprising:
a vehicle body;
a sensor device, configured to collect positioning data and a visual detection map when the vehicle is being driven; and
a processor, configured to determine map elements included in the visual detection map by performing object recognition on the visual detection map, generate a reference map based on the positioning data and image positions of the map elements in the visual detection map, and send the reference map to a server, so that the server determines map elements included in a plurality of reference maps and a first element position where each map element is located, determines map elements belonging to each object based on the first element position where each map element is located, removes the map elements belonging to a first object in response to determining that a number of map elements belonging to the first object is smaller than a threshold, obtains a second element position of a second object by performing position fusion on the first element position of each map element in each reference map belonging to the second object in response to determining that a number of map elements belonging to a second object is greater than or equal to the threshold, and marks a target element corresponding to the second object at the second element position in a target map.

8. The vehicle of claim 7, wherein the sensor device comprises: a laser radar sensor configured to collect a radar point cloud map, and an image sensor configured to collect a target image; and
wherein the processor is further configured to:
for a first map element in the radar point cloud image, determine a first candidate position of the first map element based on the positioning data and an image position of the first map element in the radar point cloud image;
for a second map element in the target image, determine a second candidate position of the second map element based on the positioning data and an image position of the second map element in the target image;
in response to the first map element and the second map element belonging to a same element category, and a difference between the first candidate position and the second candidate position being less than a threshold, merge the first map element and the second map element as a target element in a reference map; and
determine a position of the target element in the reference map based on the first candidate position and the second candidate position.

9. The vehicle of claim 7, wherein the second element position of the object is obtained further by:
obtaining the second element position of the object by performing position fusion based on the first element position of each map element in each reference map belonging to the object with a re-projection error optimization algorithm.

* * * * *